May 29, 1923.
C. R. HOUGHTON
1,457,074
CONSTANT FLOW GOVERNOR
Filed Sept. 9, 1921
2 Sheets-Sheet 2
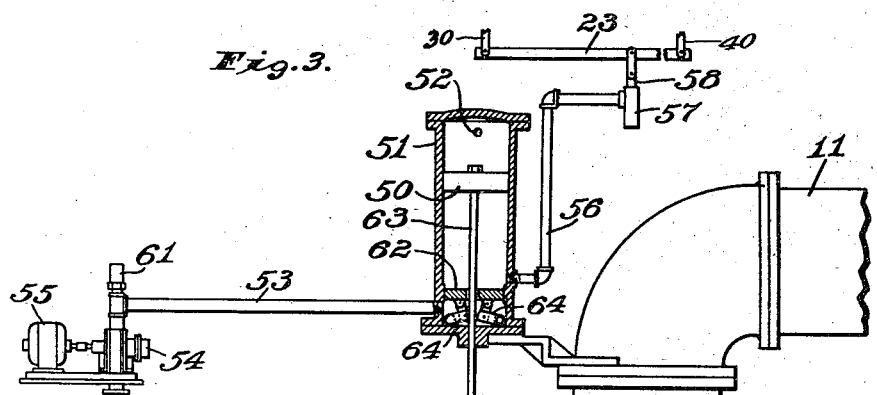
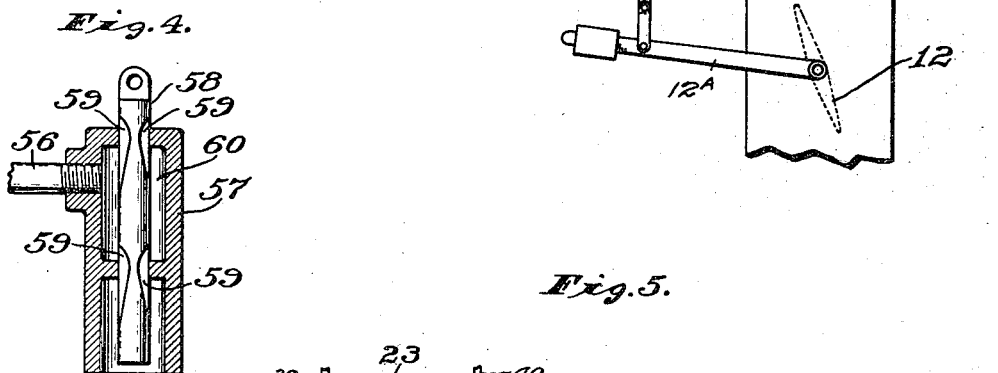
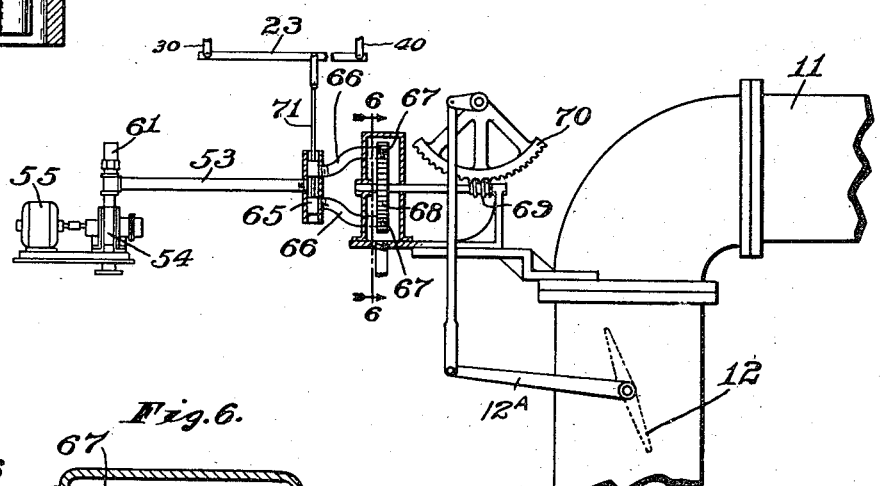
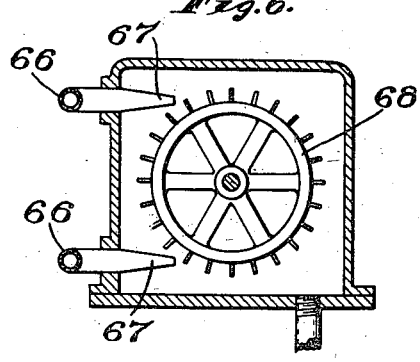
Inventor
CARL R. HOUGHTON,
By Hood & Schley
Attorneys Patented May 29, 1923.

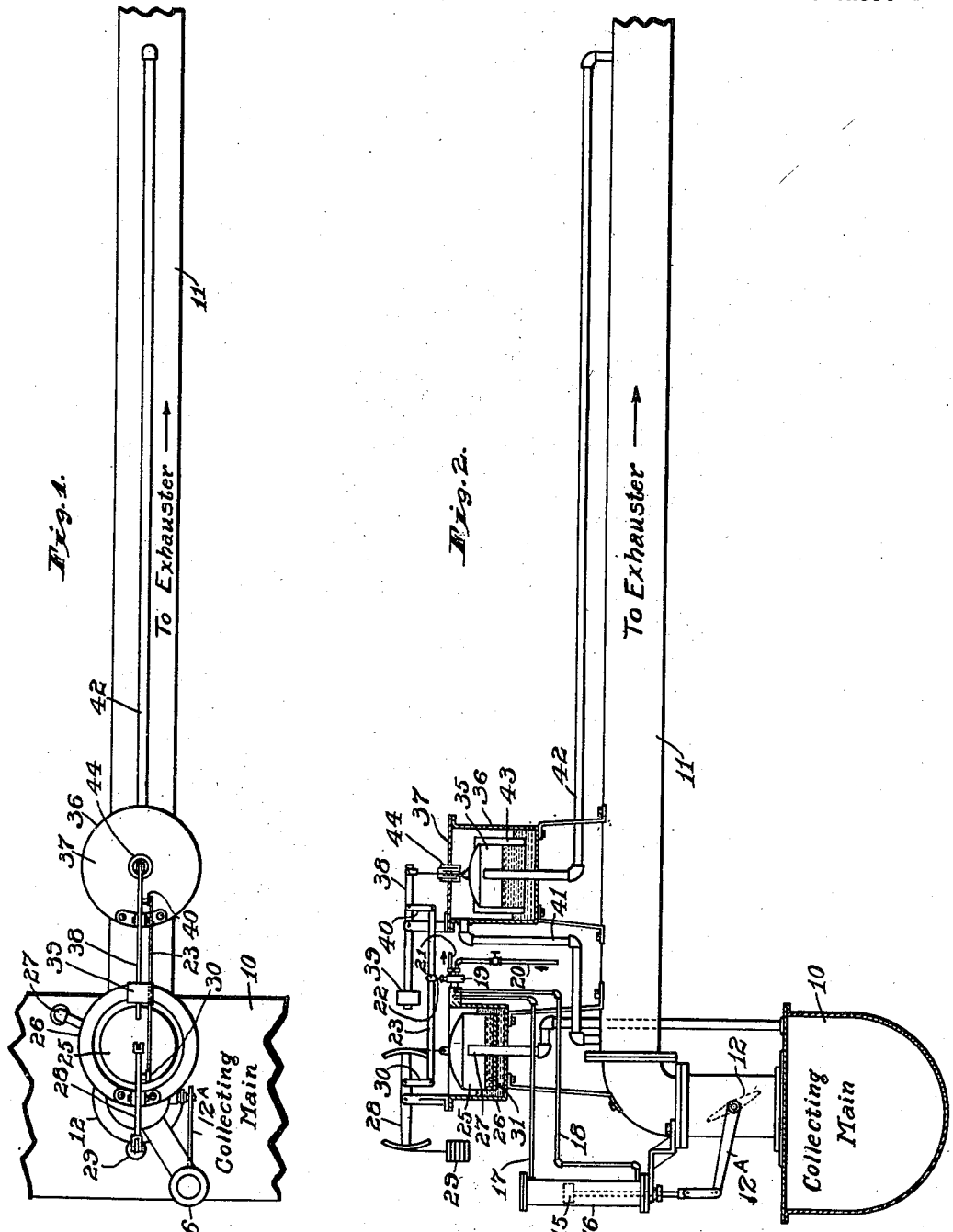

1,457,074

UNITED STATES PATENT OFFICE.

CARL R. HOUGHTON, OF CONNERSVILLE, INDIANA, ASSIGNOR TO THE CONNERSVILLE BLOWER CO., OF CONNERSVILLE, INDIANA, A CORPORATION OF INDIANA.

CONSTANT-FLOW GOVERNOR.

Application filed September 9, 1921. Serial No. 499,492.

*To all whom it may concern:*

Be it known that I, CARL R. HOUGHTON, a citizen of the United States, residing at Connersville, in the county of Fayette and State of Indiana, have invented a new and useful Constant-Flow Governor, of which the following is a specification.

It is the object of my invention to produce a governing device for maintaining constant the pressure within the collecting main of a battery of gas ovens, and to compensate for the various disturbing effects which are produced from time to time, without producing hunting or surging effects which are a cause of trouble in most gas plants.

When by-product coke plants were small, the gas from the one battery of ovens was pumped by one exhauster, and the speed of this exhauster was regulated by a gas-pressure governor or otherwise which more or less accurately varied the speed of the exhauster engine so that the exhauster would pull the gas from the ovens only as fast as the gas was given off and no faster. As the plants grew in size, it was found to be more economical to use one exhauster to pull the gas from a plurality of batteries of ovens. It then became necessary to introduce a valve in the line from each battery of ovens, because the relative quantities of gas given off by the different batteries of ovens vary from time to time, and any one battery is sometimes giving off more gas and sometimes less gas than the other batteries. These valves, which at first were hand-operated, were shortly made automatic in some manner, with the aim of keeping constant the pressure in the collecting main of its associated battery, for each battery has its own collecting main. For proper operation, it is desirable to keep the pressure in the collecting main constant within two millimeters of water-column, with the actual pressure between 2 and 5 millimeters of water-column above atmospheric pressure.

The automatic device ordinarily used for keeping constant the pressure in the collecting main has been a sensitive float-governor in which the float rises or falls upon changes in the pressure in the collecting main, to which the underside of the float is connected. This float by its movements controls directly or indirectly the operation of the collecting-main valve above referred to. This type of governor, however, fails of its purpose under certain conditions, and causes a hunting or surging action to take place because of repeated over-correction. This is especially noticeable when the gas from a freshly charged oven is turned into a collecting main. Then there is an extra supply of gas from such oven, which extra supply is suddenly forced into the collecting main. The automatic governor above referred to, under such conditions, produces an opening of the collecting-main valve to allow more gas to pass through the governor, and opens such valve quickly, so that for a few seconds there is a large flow from the collecting main to the exhauster at a rate greater than the rate at which the gas is given off, due to the elasticity of the gas. The exhauster in turn speeds up under the control of its governor to take care of this onrushing gas; but since a flow has been established which is greater than the actual amount of gas coming off, a reverse operation must take place, and the collecting-main valve must close, which creates an increased suction and for a few seconds decreases the quantity of gas flowing through such main. The exhauster responds to this and in turn slows down, but when the exhauster attemps to slow down to this new position, which is below normal, the collecting-main valve must again open and cause a greater flow of gas. This hunting or surging may keep up indefinitely.

According to my present invention, I compensate the collecting-main governor to reduce if not to wholly eliminate this hunting or surging action.

The accompanying drawings illustrate my invention: Fig. 1 is a plan of a constant-flow governor embodying my invention, showing fragments of the collecting main and of the pipe leading from the collecting main to the exhauster; Fig. 2 is a side elevation of the device shown in Fig. 1, with the floats and float containers in section; Fig. 3 is a vertical section through a different form of valve-operating device, controlled by the same constant-flow governor shown in Figs. 1 and 2; Fig. 4 is a longitudinal section of the pilot valve of Fig. 3; Fig. 5 is a view similar to Fig. 3, showing a still different form of valve-operating device, under the control of the same constant-flow governor; and Fig. 6 is a section on the line 6—6 of Fig. 5.

The collecting main 10 is the usual collecting main of a battery of ovens of a by-product coke plant, from which collecting main the usual pipe 11 leads to the exhauster. There is a collecting main 10 and pipe 11 for each battery of ovens. At the entrance to the pipe 11 is the collecting-main valve 12, which thus controls the outflow from the collecting main. The parts 10, 11, and 12 are according to standard practice.

In the arrangement shown in Figs. 1 and 2, the valve 12 is operated by the movements of a piston 15 in a cylinder 16, the two ends of which are connected by pipes 17 and 18 respectively to a pilot valve 19 which by the movements of its stem 22 controls the connections of such pipes to a fluid-pressure-supply pipe 20 and to an exhaust pipe 21 in any usual or convenient manner. This pilot valve 19 with its connections may be of the type shown in the patent to John T. Wilkin No. 1,341,696, granted June 1, 1920. The stem 22 of the pilot valve is moved by a control-lever 23, which in accordance with my invention is jointly controlled by the pressure within the collecting main 10 and by the flow of the gas through the passage 11. As shown, the stem 22 is connected to an intermediate point of the control-lever 23. The position of one end of such lever is controlled by a pressure governor responsive to the pressure in the colecting main 10. The position of the other end of such lever is cotrolled by a constant-flow governor responsive to the flow of gas through the pipe 11.

The pressure governor comprises a float 25 which is movable vertically in an open-topped liquid-container 26. A pipe 27 connected with the collecting main 10 opens beneath the float 25, so that the pressure beneath such float corresponds to that of the collecting main. The pressure on top of the float, of course, is that of the atmosphere. The float 25 is hung from one arc-shaped end of a lever 28 which from its other arc-shaped end supports a counterweight 29, the arc-shaped ends maintaining a constant length-ratio between the two arms of the lever 28. The lever 28 is connected by a link 30 to one end of the control-lever 23. When the pressure in the collecting main 10 rises, the float 25 also rises, thus shifting upward the left-hand end of the control-lever 23 and also shifting upward the stem 22 of the pilot valve 19; and this movement of the pilot valve admits fluid under pressure to the lower end of the cylinder 16 and allows fluid to escape from the upper end of such cylinder so that the piston 15 is moved upward and the collecting-main valve 12 is opened to allow more gas to pass from the collecting main into the pipe 11 and thence to the exhauster, thus lowering the pressure in the collecting main. When the pressure in the collecting main falls, the reverse action takes place. It is desirable that the movements of the float 25 shall be slow and dead-beat or free from oscillatory movement, and for that purpose such float is provided with a nearly closed bottom 31 having only a small opening around the pipe 27, so that the liquid passes into and out of such float at a slow rate. Thus the movement of the float is extremely slow, but is accurate and sensitive.

The constant-flow governor comprises a float 35 which is movable vertically in a liquid-container 36; which, however, is provided with a closed top 37, thus differing from the liquid container 26. The float 35 is connected to one end of a lever 38 provided at the other end with a counterweight 39, and the float end of the lever is connected by a link 40 to the other end of the control-lever 23 from that to which the lever 28 is connected. The upper part of the container 36 is connected by a pipe 41 to the pipe 11 at a point as close to the valve 12 as possible; and a pipe 42 which opens beneath the float 35 is connected to the pipe 11 at a point as far removed from the valve 12 and as close to the exhauster as possible without coming under the influence of the pressure in other pipes 11. Thus there is a difference in the pressures on top of and beneath the float 35 corresponding to the drop in pressure along the pipe 11 between the points where the pipes 41 and 42 are connected. This drop is proportional to the gas flow, augmented by the time lag in the transmission of any change of pressure along the pipe 11 upon changes in the position of the valve 12. The float 35 is open at the bottom so that it acts very quickly; and it may be provided with a buoyancy chamber 43 to vary its effective weight and limit its range of movement, though this is not essential. The mechanical connection of the float 35 to the lever 38, where such connection passes through the closed top 37 of the container 36, is provided with a suitable stuffing box 44, conveniently of the well known water-sealed type to prevent friction.

In operation: Upon changes in pressure in the collecting main 10, the float 25 rises or falls to cause the proper movements of the piston 15 to open or close the valve 12, as already explained. Upon the opening of the valve 12 due to a rise in the pressure in the collecting main 10, as because the gas discharged from a freshly charged oven into such collecting main, the increased flow of gas along the pipe 11 causes an increase in the difference in the pressures in the pipes 41 and 42, the pressure in the pipe 42 relatively decreasing; and this change in differential pressure forces the float 35 downward to move the stem 22 of the pilot valve in the opposite direction from that in which it is moved by the rising of the float 25, so that the valve 12 will not be opened as widely as it would have been if the constant-flow governor were not called into play. Upon fall of pressure in the collecting main 10, the reverse operation takes place. Thus the movements of the float 35 exert a compensating action on the pilot valve, to compensate for the movements produced by the float 25. This compensating action effectively prevents any material hunting or surging, for the float 35 is quick in its compensating movements, while the float 25 is relatively sluggish because of its nearly closed bottom 31. Upon long-continued changes in pressure in the collecting main 10, the continued action thereof on the float 25 causes the latter eventually to overcome the effect of the movements of the float 35, to get the proper positioning of the valve 12 independently of the flow of gas and directly dependent on the pressure in the collecting main, so that the movements of the float 35 are effective merely upon pressure changes of short duration. There is no constant relation between the position of either float 25 or 35 and the position of the valve 12, as such valve may be in any position for a given position of each of the floats.

In the arrangement shown in Figs. 1 and 2, one form by which the control-lever 23 controls the movements of the collecting-main valve 12 is illustrated. Other forms of valve-operating mechanisms may be used, under the control of the same control-lever 23. One such arrangement is shown in Figs. 3 and 4, and another in Figs. 5 and 6.

In the arrangement shown in Figs. 3 and 4, the arm 12<sup>A</sup> of the valve 12 is connected to a piston 50 vertically movable in a cylinder 51 which has a vent opening 52 near the top. A pipe 53 from a constantly driven blower 54, of any suitable type, shown as a position pressure blower driven by an electric motor 55, leads into the cylinder 51 below the piston 50 and close to the bottom of such cylinder, and a pipe 56 leads from the cylinder 51 at a point also below the piston 50 but slightly higher than the point at which the pipe 53 communicates with such cylinder. The pipe 56 leads to a pilot valve 57, shown in detail in Fig. 4. The stem 58 of this pilot valve is connected to the intermediate point of the lever 23, in the same way as the stem 22 is so connected in the arrangement shown in Figs. 1 and 2. The stem 58 has upper and lower cut-away portions 59, which co-operate with upper and lower end walls of a pilot-valve chamber 60 with which the pipe 56 communicates, so that the stem 58 is in effect a balanced valve. The pilot valve always permits a certain amount of leakage from the chamber 60 through the cut-away portions 59. Upon changes in the pressure in the collecting main 10 and in the gas-flow in the pipe 11, the control-lever 23 is moved as in the arrangement shown in Figs. 1 and 2; but in the arrangement shown in Figs. 3 and 4 such movement controls the leakage through the pilot valve 57 from the cylinder 51, permitting the piston to fall to close the valve 12 upon increase in such leakage, and causing it to rise to open such valve upon decrease in such leakage, to produce the proper correction in the collecting-main pressure. The pipe 53 is provided with a blow-off valve 61 which always permits a certain amount of air to escape, so that there is always sufficient air for the operation of the piston 50 under the control of the pilot valve 57; this keeps constant the operation of the device regardless of changes in speed in the blower 54. Within the cylinder 51 is a supplemental piston 62, near the bottom of the cylinder, at a height intermediate between the connection points of the pipes 53 and 56. This piston has an enlarged central hole through which the rod 63 of the piston 50 extends freely, so that air may pass from one side of the piston 62 to the other, but through a restricted opening whereby the piston 62 is raised while the blower 54 is in operation. When the blower 54 ceases to operate for any reason, as because of the failure of the supply of electricity for the motor 55, the supplementary piston 62 drops, and a pair of dogs 64 which are connected to such supplementary piston swing inward to grip the piston rod 63 to hold it and the valve 12 in whatever position they happen to be, so that the gas supply from the collecting main to the exhauster will not be shut off even though the automatic control is temporarily disabled.

In the arrangement shown in Figs. 5 and 6, there is the same blower 54 driven by the electric motor 55 and supplying the pipe 53 provided with the blow-off valve 61, as in the arrangement shown in Fig. 3. The pipe 53, however, is led to a control valve 65, from which two branch pipes 66 lead to nozzles 67 which play upon an impulse-turbine wheel 68 in opposite directions, so that the discharges from the two nozzles tend to turn such impulse-turbine wheel in opposite directions. The turbine wheel 68 is connected through a worm 69 and worm-gear segment 70 to operate the valve 12 in opposite directions acording as the impulse-turbine wheel is turned in oposite directions. The stem 71 of the control valve 65 is connected to an intermediate point on the lever 23, exactly as are the stems 22 and 58 of the arrangements shown in Figs. 1 and 2 and in Fig. 3 respectively. Any movement of the stem 71 oppositely controls the supply through the two pipes 66 and two nozzles 67 to produce movements of the impulse-turbine wheel 68 in opposite directions in accordance with the position of such valve stem 71. The intermediate position of the control valve 65 may be the off position or not as desired, in either case producing opposite movements of the turbine wheel 68 when the stem 71 is above or below a given intermediate point.

I claim as my invention:

1. In combination, a gas collecting main for a battery of gas ovens, a pipe extending therefrom to an exhauster, a valve controlling the flow of gas from said collecting main to said pipe, and means for controlling said valve jointly by the pressure in said collecting main and by the gas-flow along said pipe.

2. In combination, a gas collecting main for a battery of gas ovens, a pipe extending therefrom to an exhauster, a valve controlling the flow of gas from said collecting main to said pipe, operating mechanism for said valve, and means for controlling said operating mechanism by the gas-flow along said pipe.

3. In combination, a gas collecting main for a battery of gas ovens, a pipe extending therefrom to an exhauster, a valve controlling the flow of gas from said collecting main to said pipe, a movable member movable in response to variations in pressure in said collecting main, a movable member movable in response to the rate of gas flow along said pipe; and means controlled jointly by said two movable members for controlling said valve.

4. In combination, a gas collecting main for a battery of gas ovens, a pipe extending therefrom to an exhauster, a valve controlling the flow of gas from said collecting main to said pipe, a movable member movable in response to the rate of gas flow along said pipe, and means controlled by said movable member for controlling said valve.

5. In combination, a gas collecting main for a battery of gas ovens, a pipe extending therefrom to an exhauster, a valve controlling the flow of gas from said collecting main to said pipe, operating mechanism for said valve, and means responsive to the difference in pressure at two points remote from each other along such pipe for controlling said mechanism.

6. In combination, a gas collecting main for a battery of gas ovens, a pipe extending therefrom to an exhauster, a valve controlling the flow of gas from said collecting main to said pipe, and means controlled jointly by the pressure in said collecting main and by the difference in pressure at two points remote from each other along such pipe for controlling said valve.

7. In combination, a gas collecting main for a battery of gas ovens, a pipe extending therefrom to an exhauster, a valve controlling the flow of gas from said collecting main to said pipe, a movable member movable in response to variations in pressure in said collecting main, a movable member movable in response to the difference in pressure at two points remote from each other along such pipe, and means controlled jointly by said two movable members for controlling said valve.

8. In combination, a gas collecting main for a battery of gas ovens, a pipe extending therefrom to an exhauster, a valve controlling the flow of gas from said collecting main to said pipe, a movable member movable in response to the difference in pressure at two points remote from each other along such pipe, and means controlled by said movable member for controlling said valve.

9. In combination, a gas collecting main of a gas plant, a pipe leading therefrom to an exhauster, a valve controlling the flow from said collecting main into said pipe, operating means for said valve, controlling means for said valve-operating means, a lever to one point of which said controlling means is connected, a pressure-responsive device responsive to the pressure in said collecting main and connected to a second point of said lever, and a pressure-responsive device responsive to the difference in pressure at two remote points along said pipe and connected to a third point of said lever.

10. In combination, a gas collecting main of a gas plant, a pipe leading therefrom to an exhauster, a valve controlling the flow from said collecting main into said pipe, fluid-pressure-operated operating means for said valve, a pilot valve controlling said operating means, a lever to one point of which said pilot valve is connected, a pressure-responsive device responsive to the pressure in said collecting main and connected to a second point of said lever, and a pressure-responsive device responsive to the difference in pressure at two remote points along said pipe and connected to a third point of said lever.

11. In combination, a gas collecting main of a gas plant, a pipe leading therefrom to an exhauster, a valve controlling the flow from said collecting main into said pipe, operating means for said valve, controlling means for said valve-operating means, a lever to one point of which said controlling means is connected, a pressure-responsive device responsive to the pressure in said collecting main and connected to a second point of said lever, and a device responsive to the fluid flow along said pipe and connected to a third point of said lever.

12. In combination, a gas collecting main of a gas plant, a pipe leading therefrom to an exhauster, a valve controlling the flow from said collecting main into said pipe, fluid-pressure-operated operating means for said valve, a pilot valve controlling said operating means, a lever to one point of which said pilot valve is connected, a pressure-responsive device responsive to the pressure in said collecting main and connected to a second point of said lever, and a device responsive to the fluid flow along said pipe and connected to a third point of said lever.

13. In combination, a gas collecting main of a gas plant, a pipe leading therefrom to an exhauster, a valve controlling the flow from said collecting main into said pipe, operating means for said valve, controlling means for said valve-operating means, a lever to one point of which said controlling means is connected, and two floats and liquid-containers in which said floats are respectively movable, said two floats being connected respectively to two other points on said lever, the inner and outer surfaces of one of said floats being subject one to the pressure within the collecting main and the other to the pressure of the atmosphere, and the inner and outer surfaces of the other of said floats being subject respectively to the pressures at two remote points along said pipe.

14. In combination, a gas collecting main of a gas plant, a pipe leading therefrom to an exhauster, a valve controlling the flow from said collecting main into said pipe, fluid-pressure-operated operating means for said valve, a pilot valve controlling said operating means, a lever to one point of which said pilot valve is connected, and two floats and liquid-containers in which said floats are respectively movable, said two floats being connected respectively to two other points on said lever, the inner and outer surfaces of one of said floats being subject one to the pressure within the collecting main and the other to the pressure of the atmosphere, and the inner and outer surfaces of the other of said floats being subject respectively to the pressures at two remote points along said pipe.

15. In combination, a gas collecting main of a gas plant, a pipe leading therefrom to an exhauster, a valve controlling the flow from said collecting main into said pipe, operating means for said valve, controlling means for said valve-operating means, a lever to one point of which said controlling means is connected, and two floats and liquid-containers in which said floats are respectively movable, said two floats being connected respectively to two other points on said lever, the inner and outer surfaces of one of said floats being subject one to the pressure within the collecting main and the other to the pressure of the atmosphere, and the inner and outer surfaces of the other of said floats being subject respectively to the pressures at two remote points along said pipe, the first-named float being provided with a nearly closed bottom so that it is sluggish in its movements, and the second-named float being provided with a substantially open bottom so that it is quick in its movements.

16. In combination, a gas collecting main of a gas plant, a pipe leading therefrom to an exhauster, a valve controlling the flow from said collecting main into said pipe, fluid-pressure-operated operating means for said valve, a pilot valve controlling said operating means, a liver to one point of which said pilot valve is connected, and two floats and liquid-containers in which said floats are respectively movable, said two floats being connected respectviely to two other points on said lever, the inner and outer surfaces of one of said floats being subject one to the pressure within the collecting main and the other to the pressure of the atmosphere, and the inner and outer surfaces of the other of said floats being subject respectively to the pressures at two remote points along said pipe, the first-named float being provided with a nearly closed bottom so that it is sluggish in its movements, and the second-named float being provided with an substantially open bottom so that it is quick in its movements.

In witness whereof, I have hereunto set my hand at Connersville, Indiana, this 1st day of September, A. D. one thousand nine hundred and twenty one.

CARL R. HOUGHTON.